(12) United States Patent
Kang et al.

(10) Patent No.: US 11,901,546 B2
(45) Date of Patent: Feb. 13, 2024

(54) SECONDARY BATTERY, PROCESS FOR PREPARING THE SAME AND APPARATUS CONTAINING THE SECONDARY BATTERY

(71) Applicant: Contemporary Amperex Technology Co., Limited, Ningde (CN)

(72) Inventors: Meng Kang, Ningde (CN); Jiazheng Wang, Ningde (CN); Xiaobin Dong, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 172 days.

(21) Appl. No.: 17/547,291

(22) Filed: Dec. 10, 2021

(65) Prior Publication Data
US 2022/0102701 A1     Mar. 31, 2022

Related U.S. Application Data

(63) Continuation of application No. PCT/CN2020/088300, filed on Apr. 30, 2020.

(51) Int. Cl.
*H01M 4/133*     (2010.01)
*H01M 10/0525*     (2010.01)
(Continued)

(52) U.S. Cl.
CPC ......... *H01M 4/133* (2013.01); *H01M 4/1393* (2013.01); *H01M 4/364* (2013.01);
(Continued)

(58) Field of Classification Search
None
See application file for complete search history.

(56) References Cited

U.S. PATENT DOCUMENTS

| | | | | |
|---|---|---|---|---|
| 2007/0248884 A1* | 10/2007 | Tsuchiya | ............... | H01M 4/133 |
| | | | | 429/231.4 |
| 2014/0287316 A1* | 9/2014 | Ahn | ...................... | H01M 4/587 |
| | | | | 429/233 |
| 2022/0123284 A1* | 4/2022 | Park | ........................ | H01M 4/13 |

FOREIGN PATENT DOCUMENTS

| | | | |
|---|---|---|---|
| CN | 104126242 A | | 10/2014 |
| CN | 105470460 A | * | 4/2016 |

(Continued)

OTHER PUBLICATIONS

Machine translation of KR 2019-0121068 A (Year: 2019).*

(Continued)

*Primary Examiner* — Robert S Carrico
(74) *Attorney, Agent, or Firm* — East IP P.C.

(57) ABSTRACT

The present application relates to a secondary battery, a process for preparing the same and an apparatus containing the secondary battery. Particularly, the secondary battery comprises a negative electrode plate, wherein the negative electrode plate comprises a negative electrode current collector and a negative electrode film, and the negative electrode film comprises a first negative electrode film and a second negative electrode film; the first negative electrode film is disposed on at least one surface of the negative electrode current collector and comprises a first negative electrode active material; and the second negative electrode film is disposed on the first negative electrode film and comprises a second negative electrode active material; the first and second negative electrode active materials both comprise artificial graphite; the first negative electrode active material comprises primary particles, and a number percentage of the primary particles in the first negative electrode active material A satisfies A≥50%.

18 Claims, 4 Drawing Sheets

(51) Int. Cl.
*H01M 4/1393* (2010.01)
*H01M 4/36* (2006.01)
*H01M 4/587* (2010.01)
*H01M 4/02* (2006.01)

(52) U.S. Cl.
CPC ....... *H01M 4/587* (2013.01); *H01M 10/0525* (2013.01); *H01M 2004/027* (2013.01); *H01M 2220/20* (2013.01)

(56) References Cited

FOREIGN PATENT DOCUMENTS

| | | | |
|---|---|---|---|
| CN | 108807849 A | | 11/2018 |
| CN | 108807996 A | | 11/2018 |
| CN | 108886137 A | | 11/2018 |
| CN | 111082129 A | | 4/2020 |
| JP | 2013008526 A | | 1/2013 |
| JP | 2014208582 A | * 11/2014 | ............ H01M 4/587 |
| JP | 2015511389 A | | 4/2015 |
| JP | 2018088406 A | | 6/2018 |
| JP | 2019508839 A | | 3/2019 |
| KR | 1020180127213 A | | 11/2018 |
| KR | 1020190121068 A | | 10/2019 |
| WO | 2012086826 A1 | | 6/2012 |

OTHER PUBLICATIONS

Machine translation of JP 2014-208582 A (Year: 2014).*
Machine translation of CN 105470460 A (Year: 2016).*
The Second Office Action for Chinese Application No. 202080006114.0, dated Dec. 12, 2022, 8 pages.
The First Office Action for Indian Application No. 202217030895, dated Dec. 23, 2022, 5 pages.
The First Office Action for Chinese Application No. 202080006114.0, dated Jul. 14, 2022, 15 pages.
The extended European search report for EP Application No. 20933636.1, dated Jun. 10, 2022, 5 pages.
The first Office Action for Korean Application No. 10-2022-7018610, dated Jun. 28, 2023, 11 pages.
The International search report for PCT Application No. PCT/CN2020/088300, dated Jan. 20, 2021, 12 pages.
The First Office Action for Japanese Application No. 2022-532139, dated Jun. 5, 2023, 3 pages.

* cited by examiner

SECONDARY BATTERY, PROCESS FOR PREPARING THE SAME AND APPARATUS CONTAINING THE SECONDARY BATTERY

CROSS-REFERENCE TO RELATED APPLICATIONS

This application is a continuation of International Application No. PCT/CN2020/088300, filed on Apr. 30, 2020, which is hereby incorporated by reference in its entirety.

TECHNICAL FIELD

The present application belongs to the field of electrochemical technology, and more specifically, relates to a secondary battery, a process for preparing the same and an apparatuses containing the secondary battery.

BACKGROUND

As a new type of rechargeable battery with high voltage and high energy density, the secondary battery is widely used in the new energy industry due to its outstanding characteristics of light weight, high energy density, no pollution, no memory effect and long service life.

With the development of new energy industry, people put forward higher requirements for secondary batteries. However, the increase of energy density of secondary battery often brings an adverse impact on the power performance and service life of the battery. Therefore, how to improve other electrochemical properties on the premise of high energy density is the key challenge in the field of battery design.

In view of this, it is necessary to provide a secondary battery which can solve the above problems.

SUMMARY

In view of the technical problems in the background, the present application provides a secondary battery, a process for preparing the same and an apparatus including the secondary battery, which aims at achieving both good quick charging performance and cycle performance while the secondary battery has a high energy density.

In order to achieve the above object, a first aspect of the present application provides a secondary battery, comprising a negative electrode plate, wherein the negative electrode plate comprises a negative electrode current collector and a negative electrode film, and the negative electrode film comprises a first negative electrode film and a second negative electrode film; the first negative electrode film is disposed on at least one surface of the negative electrode current collector and comprises a first negative electrode active material, and the second negative electrode film is disposed on the first negative electrode film and comprises a second negative electrode active material, and the first and second negative electrode active material both comprise artificial graphite; the first negative electrode active material comprises primary particles, and a number percentage of the primary particles in the first negative electrode active material A satisfies A≥50%.

In a second aspect of the present application, there is provided a process for preparing a secondary battery, comprising preparing a negative electrode plate of the secondary battery by the following steps:

1) forming a first negative electrode film comprising a first negative electrode active material on at least one surface of a negative electrode current collector; and
2) forming a second negative electrode film comprising a second negative electrode active material on the first negative electrode film, wherein the first and second negative electrode active material both comprise artificial graphite; the first negative electrode active material comprises primary particles, and a number percentage of the primary particles in the first negative electrode active material A satisfies A≥50%.

In a third aspect of the present application, there is provided an apparatus comprising a secondary battery according to the first aspect of the present application or a secondary battery prepared according to the process of the second aspect of the present application.

Over existing technologies, the present application provides at least the following beneficial effects:

In the secondary battery according to the application, the negative electrode plate comprises a dual coating structure, and each coating active material during design is control to have different composition, so that the secondary battery can have better quick charging performance and longer cycle life on the premise of higher energy density. The apparatus according to the present application includes the secondary battery, so it has at least the same advantages as the secondary battery.

Figure 1:
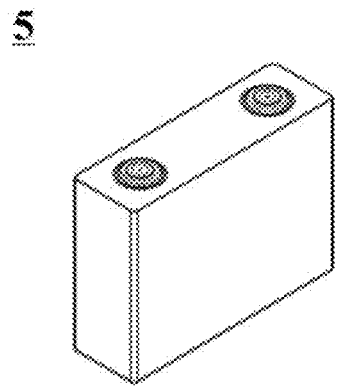
FIG. 1 shows a schematic diagram of an embodiment of a secondary battery in the present application.

The reference signs used the appended drawings are as follows:
1 Battery pack
2 Upper cabinet body
3 Lower cabinet body
4 Battery module
5 Secondary battery
51 Housing
52 Electrode assembly
53 Cover plate
10 Negative electrode plate 101 Negative electrode current collector
102 Second negative electrode film
103 First negative electrode film

DETAILED DESCRIPTION

The application is further described in combination with specific embodiment as follows. It should be understood that these specific embodiments are used only to describe the application without limitation to its scope.

For the sake of brevity, the present application explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. The recitation of "more" in the phrase "one or more" includes two or more.

Unless otherwise stated, the terms used in the present application have the common meaning known by technicians in this field. Unless otherwise stated, the values of the parameters mentioned in the present application may be measured by various methods commonly used in this field, for example, by the methods below given in the examples of the present application.

Secondary Battery

The application in a first aspect provides a secondary battery. The secondary battery comprises a positive electrode plate, a negative electrode plate and an electrolyte. During battery charging and discharging, active ions are intercalated and de-intercalated between positive and negative electrode plates. Electrolytes act as conducting ions between positive and negative electrode plates.

[Negative Electrode Plate]

In secondary batteries, in order to increase energy density of batteries, often the thickness of negative electrode films is increased, but the increase in thickness will affect both quick charging performance and cycle performance of the batteries. This is because the negative electrode active material swells during cycle, resulting in a decrease in the binding force between active material and substrate, and even film releasing. As the thickness increases, this phenomenon becomes more serious. At the same time, the increase in thickness renders the diffusion path of active ions to increase, so that the quick charging performance of the batteries will also be affected. Therefore, how to make the battery have better quick charging performance and cycle performance under the premise of higher energy density is still a big technical challenge.

The inventor found through a large number of experiments that the technical goal of the present application can be achieved by adjusting the preparation process of the negative electrode plate. In particular, in the secondary battery according to the application, the negative electrode plate comprises a negative current collector and a negative electrode film, wherein the negative electrode film comprises a first negative electrode film and a second negative electrode film; the first negative electrode film is disposed on at least one surface of the negative current collector and comprises a first negative electrode active material; the second negative electrode film is disposed on the first negative electrode film and comprises a second negative electrode active material; the first and second negative electrode active material both comprise artificial graphite; the first negative electrode active material comprises primary particles, and a number percentage of primary particles in the first negative electrode active material A satisfies A≥50%.

Through research, the inventors have found that when the negative electrode plate satisfies the above design conditions, the secondary battery can have both good quick charging performance and cycle performance while the secondary battery has a higher energy density. Specifically, when the first negative electrode active material and the second negative electrode active material both comprise artificial graphite, and a number percentage of primary particles in the first negative electrode active material is A≥50%, the contact area between the first negative electrode active material and the current collectors can be effectively increased. This increased contact can ensure the bonding reliability during multiple charging and discharging for a long period, and at the same time improve the electron conduction efficiency, thereby effectively improving the cycle performance and quick charging performance of the batteries.

In some preferred embodiments, the number percentage A of primary particles in the first negative electrode active material satisfies: A≥70%, more preferably, 80%≤A≤100%. For example, the range of A may be: 75%≤A≤98%, 80%≤A≤95%, 85%≤A≤100%, 90%≤A≤100%, and the like.

The inventors have through in-depth research found that when the negative electrode active material and negative electrode film of the present application meet the above design conditions, the performance of the secondary battery may be further optimized in the case that one or more of the following parameters are satisfied.

In some preferred embodiments, the second negative electrode active material includes secondary particles, and a number percentage B of the secondary particles in the second negative electrode active material satisfies: B≥30%. Through research, the inventors found that the second negative electrode film is closer to the separator side, and the concentration of active ions in its area is higher; if the active material in the second negative electrode film contains a certain amount of secondary particles, the de-intercalated active ion channels it can provide will increase so as to match the actual distribution of active ions in this area, thereby further improving quick charging performance and cycle performance of the battery. More preferably, the number percentage B of the secondary particles in the second negative electrode active material satisfies B≥50%. For example, the number percentage B may satisfy 30%≤B≤100%, 40%≤B≤85%, 45%≤B≤98%, 50%≤B≤100%, 55%≤B≤95%, 60%≤B≤98%, 80%≤B≤99%, or 70%≤B≤95%.

In some preferred embodiments, artificial graphite is present in the first negative electrode active material in a mass percentage of ≥50%, more preferably from 60% to 100%.

In some preferred embodiments, artificial graphite is present in the second negative electrode active material in a mass percentage of ≥80%, more preferably from 90% to 100%.

In some preferred embodiments, the volume distribution particle size $D_v10$ of the first negative electrode active material is smaller than the volume distribution particle size $D_V10$ of the second negative electrode active material. The volume distribution particle size $D_V10$ can reflect the proportion of smaller particles in the active material. When the volume distribution particle size $D_V10$ of the first negative electrode active material is smaller than the volume distribution particle size $D_V10$ of the second negative electrode active material, the volume energy density and quick charging performance of the battery can be further improved.

In some preferred embodiments, the volume distribution particle size $D_V10$ of the first negative electrode active material may be from 3 μm to 8 μm, more preferably from 4 μm to 7 μm.

In some preferred embodiments, the volume distribution particle size DV10 of the second negative electrode active material may be 5 μm to 11 μm, more preferably 6 μm to 10 μm.

In some preferred embodiments, the tap density of the first negative electrode active material is greater than the tap density of the second negative electrode active material. When the tap density of the first negative electrode active material is greater than the tap density of the second negative electrode active material, the battery can have both higher volume energy density and better quick charging performance.

In some preferred embodiments, the first negative electrode active material may have a tap density of from 0.8 g/cm³ to 1.3 g/cm³, more preferably from 0.95 g/cm³ to 1.15 g/cm³.

In some preferred embodiments, the second negative electrode active material may have a tap density of from 0.7 g/cm³ to 1.2 g/cm³, more preferably from 0.85 g/cm³ to 1.05 g/cm³.

In some preferred embodiments, the volume distribution particle size $D_V50$ of the first negative electrode active material is greater than the volume distribution particle size $D_V50$ of the second negative electrode active material. When the volume distribution particle size $D_V50$ of the first negative electrode active material is greater than the volume distribution particle size $D_V50$ of the second negative electrode active material, it matches well with the concentration gradient distribution of active ions during charging and discharging process of the batteries, which can effectively improve the quick charging performance of the batteries. In addition, the first negative electrode active material has a larger particle size, which has more vacancies for receiving active ions, that is, a larger gram capacity, so that it is conducive to the improvement of mass energy density of the batteries. At the same time, the second negative electrode active material has a smaller particle size, and binders have more attachment sites on its surface, so that the particles are less broken during cold pressing, and the probability of the material to produce a new surface is reduced. Therefore, it has a strong electrical conductivity during charging and discharging process of the batteries, and can effectively suppress the "broken bridge" phenomenon of the electrolyte, thereby further improving cycle life of the batteries.

In some preferred embodiments, the volume distribution particle size $D_V50$ of the first negative electrode active material may be from 13 μm to 21 μm, more preferably from 15 μm to 19 μm.

In some preferred embodiments, the volume distribution particle size $D_V50$ of the second negative electrode active material may be from 11 μm to 19 μm, more preferably from 13 μm to 17 μm.

In some preferred embodiments, the graphitization degree of the first negative electrode active material is greater than the graphitization degree of the second negative electrode active material. When the graphitization degree of the first negative electrode active material is greater than the graphitization degree of the second negative electrode active material, the energy density and cycle performance of the batteries can be further improved.

In some preferred embodiments, the graphitization degree of the first negative electrode active material may be from 92% to 97%, more preferably from 93% to 96%.

In some preferred embodiments, the graphitization degree of the second negative electrode active material may be from 90% to 95%, more preferably from 92% to 94%.

In some preferred embodiments, the specific surface area (SSA) of the first negative electrode active material is greater than the specific surface area (SSA) of the second negative electrode active material. When the specific surface area (SSA) of the first negative electrode active material is greater than the specific surface area (SSA) of the second negative electrode active material, the energy density and quick charging performance of the batteries can be further improved.

In some preferred embodiments, the specific surface area (SSA) of the first negative electrode active material is from 1.6 m²/g to 2.6 m²/g, more preferably from 1.8 m²/g to 2.3 m²/g.

In some preferred embodiments, the specific surface area (SSA) of the second negative electrode active material is from 0.7 m²/g to 1.5 m²/g, more preferably from 0.8 m²/g to 1.3 m²/g.

In some preferred embodiments, the thickness of the negative electrode film is ≥60 μm, and more preferably from 65 μm to 80 μm. It shall be noted that the thickness of the negative electrode film is the sum of the thicknesses of the first negative electrode film and the second negative electrode film.

In some preferred embodiments, the thickness ratio of the second negative electrode film to the first negative electrode film is from 1:1 to 3:2. When the thickness ratio of the first and second negative electrode films is within the given range, it is beneficial to formation of a gradient pore distribution in the upper and lower layers, which reduces the liquid phase conduction resistance of de-intercalated active ions from the positive electrode on the surface of the negative electrode film, and does not result in lithium precipitation caused by ion accumulation on the surface. Meanwhile, the uniform diffusion of active ions in the film is beneficial to reducing polarization, which can further improve the quick charging performance and cycle performance of the battery.

In some preferred embodiments, the areal density of the negative electrode film is from 8 mg/cm² to 13 mg/cm², preferably from 9 mg/cm² to 12.5 mg/cm². It is necessary to note that the areal density of the negative electrode film refers to the areal density of the overall negative electrode film, i.e., the sum of the areal density of the first negative electrode film and that of the second negative electrode film.

In some preferred embodiments, the compacted density of the negative electrode film is from 1.4 g/cm³ to 1.7 g/cm3, preferably from 1.5 g/cm³ to 1.65 g/cm³. It is necessary to note that the compacted density of the negative electrode film refers to the compacted density of the overall negative electrode film, i.e., the ratio of the areal density of the negative electrode film to the thickness of the negative electrode film. When the compacted density of the negative electrode film is within the given range, it enables the negative electrode plate to have a high reversible capacity, but also has good low cycle expansion performance and dynamic performance, thereby further improving the energy density, quick charging capacity and cycle performance of the batteries.

Figure 9:
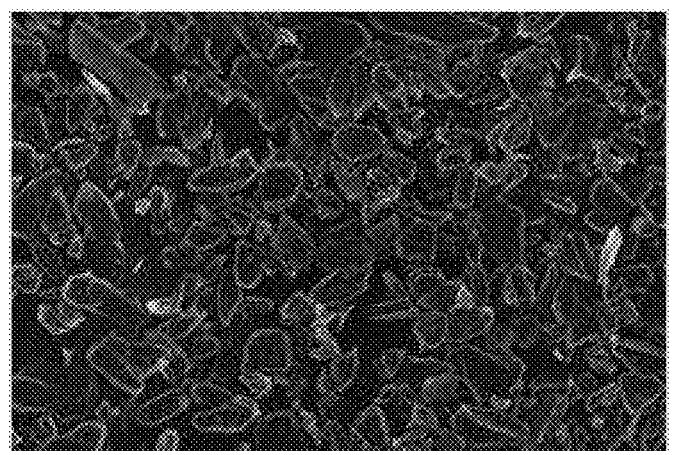
FIG. 9 shows a SEM image of the primary particles in an embodiment of a first negative electrode active material in the present application.
Figure 10:
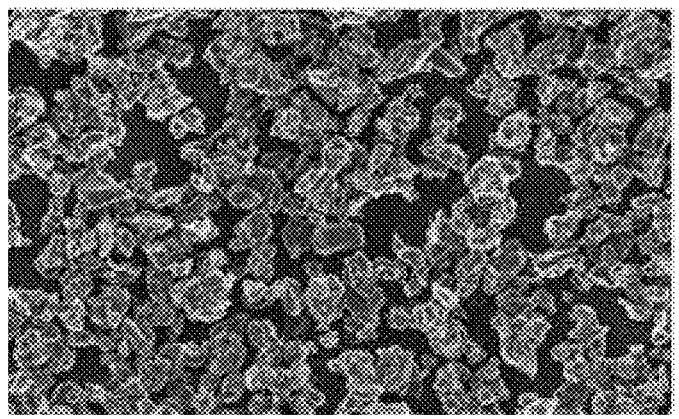
FIG. 10 shows a SEM image of the secondary particles in an embodiment of a second negative electrode active material in the present application.

In the present application, the terms "primary particles" and "secondary particles" have meanings well known in the art. Primary particles refer to particles without agglomeration, and secondary particles refer to particles in an agglomerated state formed by aggregating two or more primary particles. The primary and secondary particles can be easily distinguished by taking SEM images using a scanning electron microscope. For example, FIG. 9 shows a SEM image of primary particles in a typical first negative electrode active material, and FIG. 10 shows a SEM image of secondary particles in a typical second negative electrode active material.

The number percentage of the primary particles or secondary particles in a negative electrode active material can be measured by a method known in the art, e.g. by a scanning electron microscope. For example, the number percentage of the primary particles in a negative electrode active material can be measured by laying and adhering a negative electrode active material on a conductive adhesive to prepare a sample to be tested with a long*width of 6 cm×1.1 cm; and testing the particle morphology using a scanning electron microscope (e.g. ZEISS Sigma 300). The test can be carried out with reference to JY/T010-1996. In order to ensure the accuracy of the test result, a plurality of (for example, 20) different areas can be randomly selected from the sample to be tested to perform the scan test, and under a certain magnification (for example, 1000 times), the percentage of the number of the primary particles in each area being tested to the total number of the particles is calculated to give the number percentage of the primary particles in the area; then the average value of the calculation results of the plurality of test areas is taken as the number percentage of the primary particles in the negative electrode active material. The number percentage of the secondary particles in the negative electrode active material can be measured similarly.

In the present application, the tap density of the negative electrode active material has a meaning well known in the art and can be tested using a method known in the art. For example, the test can be performed by using a powder tap density tester (such as the Dandong Baitt BT-301) and using 25 mL graduated cylinder with reference to the standard GB/T5162-2006 and GB/T 24533-2009.

In the present application, $D_v10$ and $D_v50$ of the negative electrode active material both have meanings known in the art and can be tested using methods known in the art. This can be measured, for example, by a laser diffraction particle size distribution tester (e.g., a Malvern Mastersizer 3000) with reference to e.g. the standard GB/T19077.1-2016.

Here, the physical definitions of $D_v10$ and $D_v50$ are as follows: $D_v10$ refers to the corresponding particle size when the cumulative volume percentage of the negative electrode active material reaches 10%; and $D_v50$ refers to the corresponding particle size when the cumulative volume percentage of the negative electrode active material reaches 50%.

In the present application, the graphitization degree of the negative electrode active material has a common meaning in this field and can be tested using methods already known in this field. For example the test could be performed using an X-ray diffractometer (e.g. Bruker D8 Discover) with reference to JIS K 0131-1996 and JB/T 4220-2011 to measure the size of d002. And then the graphitization degree can be calculated according to the formula $G=(0.344-d002)/(0.344-0.3354)\times100\%$, where d002 is the interlayer spacing of negative active material crystal structure in nm. CuKa rays are usually used as a radiation source in an X-ray diffraction analysis test, with a radiation wavelength of $\lambda=1.5418$ Å, a 2θ scanning range of from 20° to 80° s, and a scanning speed of 4°/min.

In the present application, the specific surface area (SSA) of a negative active material has a common meaning in the art and can be tested by the method known in this field. For example, with reference to GB/T 19587-2017, it may be tested with a nitrogen adsorption specific surface area analysis test method and calculated by a BET (Brunauer Emmett Teller) method, wherein the nitrogen adsorption specific surface area analysis test can be implemented using Tri-Star 3020 type of Specific surface area pore size analysis tester from Micromeritics company, USA.

In the present application, the thickness of the negative electrode film can be measured with a high-qualified micrometer, for example, Mitutoyo293-100 with an accuracy of 0.1 μm.

In the present application, the respective thicknesses of the first negative electrode film and the second negative electrode film can be measured by using a scanning electron microscope (such as Zeiss sigma 300). As an example, the test method may be as follows: firstly, cutting the negative electrode into a certain size sample to be tested (e.g. 2 cm×2 cm), fixing the negative electrode sample on a sample station by paraffin. Then the sample station is placed onto the sample holder and well fixed. An argon cross-section polisher (such as IB-19500CP) is powered on and vacuumed (to e.g. $10^{-4}$ Pa), various parameters such as argon flow (such as 0.15 MPa), voltage (such as 8 KV) and polishing period (such as 2 hours) are set, and the sample holder is adjusted to start polishing in a swing mode. For sample testing, reference can be made to JY/T 010-1996. To ensure the accuracy of the test results, several (for example, 10) different areas in the test sample may be randomly selected for scanning and testing, and at a certain magnification (for example, 500 times), the respective thickness of the first negative electrode film and the second negative electrode film are read in the measuring areas, and then the average value of the test results from the several test areas are taken as the average thickness of the first negative electrode film and the second negative electrode film, respectively.

In the present application, the areal density of the negative electrode film has a common meaning in this field and can be tested using methods known in this field. As an example, the test method may be as follows. A negative electrode plate subjected to a single-side coating and cold pressing is taken (if the negative electrode plate to be tested is subjected to a double-side coating, one side of the negative electrode film can be wiped off firstly), cut into small round disks with an area of S1, and the weight thereof is recorded as M1. Then the negative electrode film on the weighed negative electrode plate is wiped off and the negative electrode current collector is weighed again and the weight is recorded as M0. The areal density of the negative electrode film can be determined by the formula: (weight of negative electrode plate M1−weight of negative electrode current collector M0)/S1. To ensure the accuracy of the test result, multiple (such as 10) of test samples may be tested, and the average value is calculated as the test result.

The compacted density of negative electrode film has a common meaning in this field and can be tested by methods already known in this field. For example, the areal density and thickness of negative electrode film could be obtained according to the above test methods, and the compacted density of negative electrode film is equal to areal density of negative electrode film/thickness of negative electrode film.

It should be noted that the above-mentioned various parameter tests for the negative electrode active material can be performed by sampling and testing before coating, or can be performed by sampling and testing from the negative electrode film after cold pressing.

If the above test samples are taken from the negative electrode film after cold pressing for testing, as an example, they can be sampled as follows:

(1) Firstly, a cold-pressed negative electrode film is randomly selected, and samples of the second negative electrode active material are taken by scraping powders (a blade can be used for sampling), wherein the depth of the powder scraping should not be more than the boundary between the first negative electrode film and the second negative electrode film;

(2) Secondly, samples of the first negative electrode active material are taken. Since there may be an inter-fusion layer between the first negative electrode film and the second negative electrode film during the cold pressing process (that is, the first active material and the second active material are both present in the inter-fusion layer), the inter-fusion layer can be scraped off first before sampling the first negative electrode active material, and then the first negative electrode active material is scraped to get the samples for the accuracy of the measurement; and (3) The samples of the first negative electrode active material and the second negative electrode active material as collected above are placed into deionized water respectively, subjected to suction filtration followed by drying, and then the dried negative electrode active materials are sintered at a certain temperature and time (for example, at 400° C. for 2 h) to remove the binder and conductive carbon, giving the test samples of the first negative electrode active material and the second negative electrode active material.

In the above sampling process, the boundary between the first negative electrode film and the second negative electrode film can be determined with the aid of an optical microscope or a scanning electron microscope.

Negative electrode active material used in the present application is commercially available.

In the secondary battery according to the present application, the negative electrode film can be arranged on either or both of the two opposite surfaces of the negative electrode current collector.

Figure 2:
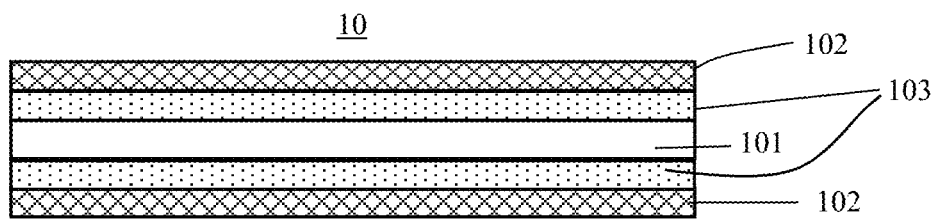
FIG. 2 shows a schematic diagram of an embodiment of a negative electrode plate of a secondary battery in the present application.

FIG. 2 shows the schematic diagram of an embodiment of the negative electrode plate 10 in the present application. The negative electrode plate 10 is composed of the negative electrode current collector 101, the first negative electrode films 103 arranged on the two surfaces of the negative electrode current collector, and the second negative electrode films 102 arranged on the first negative electrode films 103.

Figure 3:
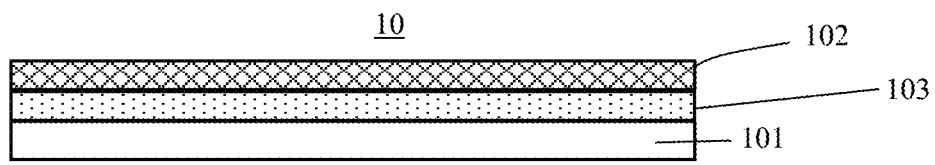
FIG. 3 shows a schematic diagram of another embodiment of a negative electrode plate of a secondary battery in the present application.

FIG. 3 shows the schematic diagram of another embodiment of the negative electrode plate 10 in the present application. The negative electrode plate 10 is composed of the negative electrode current collector 101, the first negative electrode film 103 arranged on one surface of the negative electrode current collector, and the second negative electrode film 102 arranged on the first negative electrode film 103.

It shall be noted that each negative electrode film parameter, such as thickness, area density, compacted density of the negative electrode film and so on, given in the present application refers to a parameter range of a single-side film. If the negative electrode films are located on both surfaces of the negative electrode current collector, and the film parameter on either surface satisfies requirements of the present application, it should be deemed to fall within the protection scope of the present application. The ranges of the film thickness, areal density and the like mentioned in the present application refer to the parameters of the film after cold pressing used for assembly of a battery.

In the secondary battery according to the present application, the negative electrode current collector may be a common metal foil or a composite electrode current collector in which a metal material may be arranged on a polymer substrate to form the composite electrode current collector. As an example, the negative electrode current collector can be a copper foil.

In the secondary battery of the present application, the first negative electrode film and/or the second negative electrode film generally contains a negative electrode active material, and an optional binder, an optional conductive agent, as well as other optional auxiliaries, and is generally formed by coating and drying a negative electrode film slurry. The negative electrode film slurry is generally formed by dispersing the negative electrode active material and optionally a conductive agent, a binder, and the like in a solvent, such as N-methylpyrrolidone (NMP) or deionized water, with stirring uniformly. Other optional auxiliaries may be, for example, thickening and dispersing agents (e.g. sodium carboxyl methylcellulose, CMC-Na), PTC thermistor materials, and the like.

As an example, the conductive agent may include one or more of the superconducting carbon, acetylene black, carbon black, Ketjen black, carbon dots, carbon nanotubes, graphene, and carbon nanofibers.

As an example, the binder may include one or more of the styrene-butadiene rubber (SBR), water-based acrylic resin, polyvinylidene fluoride (PVDF), polytetrafluoroethylene (PTFE), ethylene-vinyl acetate copolymer (EVA), polyvinyl alcohol (PVA) and polyvinyl butyral (PVB).

In the secondary battery of the present application, the first negative electrode active material and/or the second negative electrode active material may optionally include a certain amount of other common negative electrode active materials, such as one or more of soft carbon, hard carbon, silicon-based materials, tin-based materials, and lithium titanate, in addition to the specific negative electrode active material described above. The silicon-based material can be one or more selected from the elemental silicon, silicon-oxygen compound, silicon carbon complex and silicon alloy. The tin-based material can be one or more selected from elemental tin, tin oxygen compound, and tin alloys. Methods for preparing these materials are well known and these materials are commercially available. Technicians in this field can make appropriate choices based on the actual application environment.

In the secondary battery according to the present application, the negative electrode plate does not exclude other additional functional layers than the negative electrode film described above. For example, in some embodiments, the negative electrode plate described herein may further comprise a conductive layer (e.g., consisting of a conductive agent and a binder) disposed between the current collector and the first film. In some other embodiments, the negative electrode plate may further include a protective cover layer disposed on the surface of the second film.

[Positive Electrode Plate]

In the secondary battery of the present application, the positive electrode plate comprises a positive electrode current collector and a positive electrode film arranged on at least one surface of the positive electrode current collector and comprising a positive electrode active material.

It should be noted that the positive electrode current collector has two opposite surfaces in the direction of its thickness. The positive electrode film may be laminated on either or both of the two opposite surfaces of the positive electrode current collector.

In the secondary battery of the present application, the positive electrode current collector may be a metal foil or a composite electrode current collector in which a metal material can be arranged on a polymer substrate to form the composite electrode current collector. As an example, the positive electrode current collector maybe an aluminum foil.

In the secondary battery of the present application, the positive electrode active material may be a positive active material known in the art for secondary batteries. For example, the positive electrode active material may include one or more of lithium transition metal oxides, lithium phosphates of olivine structure and their respective modified compounds. Examples of lithium transition metal oxides may include but are not limited to one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and their modified compounds. Examples of lithium phosphates in olivine structures may include, but may not be limited to, one or more of lithium iron phosphate, a composite of lithium iron phosphate with carbon, lithium manganese phosphate, a composite of lithium manganese phosphate with carbon, lithium iron manganese phosphate, a composite of lithium iron manganese phosphate with carbon and their modified compounds. The present application is not limited to these materials, but may also adopt other conventional and common materials that can be used as positive electrode active materials for secondary batteries.

In some preferred embodiments, in order to further increase the energy density of the battery, the positive electrode active material may include one or more of a lithium transition metal oxide represented by formula 1 and the modified compounds thereof,

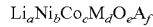

$$Li_aNi_bCo_cM_dO_eA_f \quad \text{Formula 1,}$$

in which, $0.8 \le a \le 1.2$, $0.5 \le b < 1$, $0 < c < 1$, $0 < d < 1$, $1 \le e \le 2$, $0 \le f \le 1$, M is one or more selected from Mn, Al, Zr, Zn, Cu, Cr, Mg, Fe, V, Ti and B, and A is one or more selected from N, F, S, and Cl.

In the present application, the modified compounds of above-mentioned materials may be compounds obtained by doping and/or surface coating of materials for modification.

In the secondary battery of the present application, the positive electrode film also optionally comprises a binder and a conductive agent.

As an example, the binder for the positive electrode film may include one or more of polyvinylidene fluoride (PVDF) and polytetrafluoroethylene (PTFE).

As an example, the conductive agent for the positive electrode film may include one or more of superconducting carbon, acetylene black, carbon black, Ketjen black, carbon dot, carbon nanotube, graphene and carbon nanofiber.

[Electrolyte]

Electrolytes act as conducting ions between positive and negative electrode plates. The present application has no specific limitation on the type of electrolyte, which may be selected according to requirements. For example, electrolytes may be at least one selected from solid and liquid electrolytes (i.e. electrolyte solution).

In some embodiments, the electrolyte is an electrolyte solution. The electrolyte solution includes an electrolyte salt and a solvent.

In some embodiments, the electrolyte salt can be one or more selected from $LiPF_6$ (Lithium Hexafluorophosphate), $LiBF_4$ (Lithium Tetrafluoroborate), $LiClO_4$ (Lithium Perchlorate), $LiAsF_6$ (Lithium Hexafluoroarsenate), LiFSI (Lithium Bisfluorosulfonimide), LiTFSI (Lithium Bis(trifluoromethanesulfonyl)imide), LiTFS (Lithium Trifluoromethanesulfonate), LiDFOB (Lithium Difluoro(oxalate) borate), LiBOB (Lithium Bis(oxalate)borate), $LiPO_2F_2$ (Lithium Difluorophosphate), LiDFOP (Lithium Difluorodioxalate phosphate) and LiTFOP (Lithium Tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluorinated ethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulphide (EMS), and ethyl sulfonyl ethanol (ESE).

In some embodiments, additives are also optionally included in the electrolyte solution. For example, additives may include negative electrode film forming additives, or positive electrode film forming additives, as well as additives that can improve some performances of batteries, such as additives that improve battery overcharge performance, additives that improve high-temperature performance, and additives that improve low-temperature performance.

[Separator]

Secondary batteries using electrolyte solutions, as well as some secondary batteries using solid-state electrolytes, also include a separator. The separator is arranged between the positive electrode plate and the negative electrode plate for isolation. The present application has no special limitation on the type of separator. Any common porous separator with good chemical and mechanical stability can be selected.

In some embodiments, the material of the separator may be one or more selected from glass fibers, non-woven fabrics, polyethylene, and polypropylene and polyvinylidene fluoride. The separator can be either a single-layer film or a multi-layer composite film. When the separator is a multi-layer composite film, the materials of each layer may be the same or different.

In some embodiments, an electrode assembly can be made by winding or laminating the positive electrode plate, negative electrode plate and separator.

In some embodiments, the secondary battery may include an external package. The external package can be used to encapsulate the electrode assembly and electrolyte.

In some embodiments, the external package of the secondary battery may be a hard shell, such as hard plastic shell, aluminum shell, and steel shell. The external package of the secondary battery can also be a soft pack, such as a bag-type soft pack. The soft pack may be made of plastics such as one or more of polypropylene (PP), polybutylene terephthalate (PBT), polybutylene succinate (PBS), and the like.

The present application has no special limitation on the shape of the secondary battery, which may be cylindrical, square or any other arbitrary shape. FIG. 1 shows a secondary battery 5 with a square-shaped structure as an example.

Figure 4:
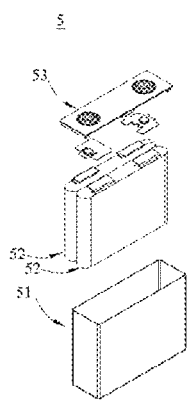
FIG. 4 shows a decomposition diagram of an embodiment of a secondary battery in the present application.

In some embodiments, the external package may include a housing 51 and a cover plate 53, as shown in FIG. 4. Housing 51 may include the bottom plate and the side plate attached to the bottom plate. The bottom plate and the side plate are enclosed to form an accommodation chamber. The housing 51 has an opening communicating with the accommodation chamber, and the cover plate 53 is used to cover the opening to close the accommodation chamber. The positive electrode plate, the negative electrode plate and the separator can form an electrode assembly 52 by winding or laminating process. The electrode assembly 52 is encapsulated in the accommodation chamber. The electrode assembly 52 is infiltrated by the electrolyte solution. The number of electrode assemblies 52 contained in the secondary battery 5 may be one or more, and may be adjusted according to requirements.

In some embodiments, the secondary batteries can be assembled into a battery module. The number of secondary batteries in the battery module can be more than one. The specific number can be adjusted according to the application and capacity of the battery module.

Figure 5:
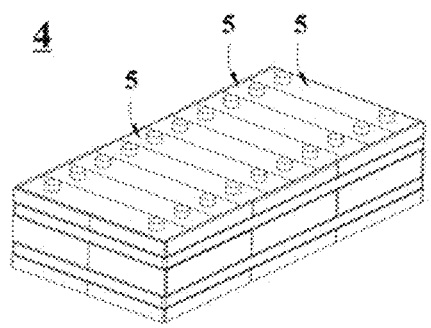
FIG. 5 shows a schematic diagram of an embodiment of a battery module.

FIG. 5 shows the battery module 4 as an example. With reference to FIG. 5, in the battery module 4, multiple secondary batteries 5 may be arranged in sequence along the length direction of battery module 4. Of course, it can also be arranged in any other ways. Further, the multiple secondary batteries 5 can be fixed by fasteners.

Optionally, the battery module 4 can also include a house with the accommodation space, in which multiple secondary batteries 5 are accommodated.

In some embodiments, the battery modules can also be assembled into a battery pack. The number of battery modules contained in the battery pack can be adjusted according to the application and capacity of the battery pack.

Figure 6:
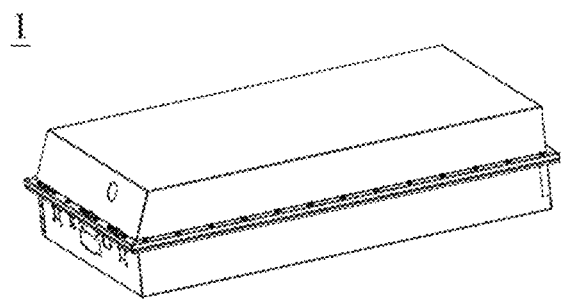
FIG. 6 shows a schematic diagram of an embodiment of a battery pack.
Figure 7:
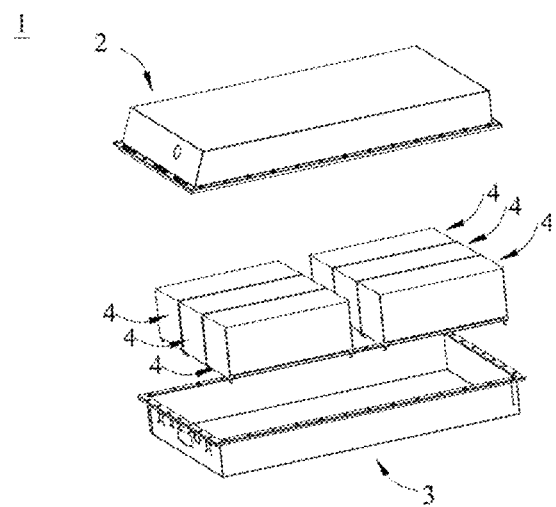
FIG. 7 is an exploded diagram of FIG. 6.

FIGS. 6 and 7 are of the battery pack 1 as an example. With reference to FIG. 6 and FIG. 7, the battery pack 1 may include a battery cabinet body and multiple battery modules 4 set in the battery cabinet body. The battery cabinet body comprises an upper cabinet body 2 and a lower cabinet body 3, wherein the upper cabinet body 2 is used to cover the lower cabinet body 3 and form a closed space for accommodating the battery module 4. Multiple battery modules 4 can be arranged in any way in the battery cabinet body.

Process for Preparing Secondary Batteries

In the second aspect of the present application, a process for preparing a secondary battery is provided, including preparing a negative electrode plate of the secondary battery by the following steps:

1) forming a first negative electrode film comprising a first negative electrode active material on at least one surface of a negative electrode current collector; and 2) forming a second negative electrode film comprising a second negative electrode active material on the first negative electrode film, wherein the first and second negative electrode active material both comprise artificial graphite; the first negative electrode active material comprises primary particles, and a number percentage of the primary particles in the first negative electrode active material A satisfies A≥50%.

In the above preparation process, the first negative electrode film and the second negative electrode film may be applied at the same time, or may be applied separately.

Preferably, the first negative electrode film and second negative electrode film are simultaneously applied. The first and second negative electrode films can be better bonded by coating together in one step, which may further improve the cycle performance of the battery.

Except for the process for preparing the negative electrode plate of the present application, other configurations and preparation processes of the secondary battery according to the present application are known per se. For example, the positive plate of the present application can be prepared as follows: mixing an positive electrode active material, optional conductive agents (such as carbon materials for example carbon black) and binders (such as PVDF) and the like, dispersing the mixture into a solvent (such as NMP), uniformly stirring, coating the mixture on a positive current collector, and drying to obtain a positive plate. Material such as aluminum foil or porous metal plate can be used as a positive electrode current collector. When the positive plate is manufactured, a positive tab can be obtained in the uncoated area of the positive current collector through modes of punching or laser die cutting and the like.

Finally, the positive electrode plate, the separator and the negative electrode plate can be stacked, with the separator between the positive and negative electrode plates working for isolation, and then the electrode assembly can be formed by a winding or laminating process; the battery assembly is placed in an external package, into which the electrolyte solution is injected when it is dried. After that, the processes of vacuum packing, steady standing, formation, and shaping are carried out, thereby obtaining a secondary battery.

Apparatus

An apparatus is provided in the third aspect of the present application. The apparatus comprises a secondary battery according to the first aspect of the present application or comprises a secondary battery prepared by the process according to the second aspect of the present application. The secondary battery can be used as the power source of the apparatus or as the energy storage unit of the apparatus. The apparatus in the present application uses the secondary battery provided in the present application and thus has at least the same advantage as the secondary battery.

The apparatus can be, but is not limited to, a mobile apparatus (such as mobile phone, laptop, etc.) or an electric vehicle (such as pure electric vehicle, hybrid electric vehicle, plug-in hybrid electric vehicle, electric bicycle, electric scooter, electric golf cart, electric truck, etc.), electric train, ship and satellite, energy storage system, etc.

The apparatus may be a secondary battery, battery module or battery pack according to its application requirement.

Figure 8:
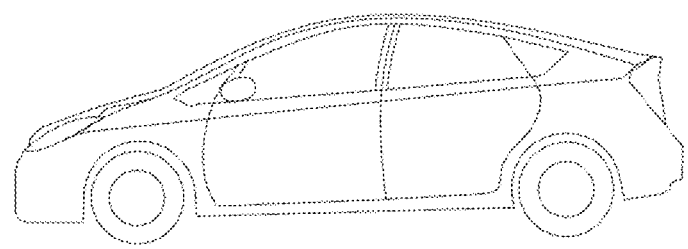
FIG. 8 shows a schematic diagram of an embodiment of an apparatus in the present application that applies the secondary battery as a power source.

FIG. 8 shows an apparatus as an example. The apparatus is may be pure electric vehicle, hybrid electric vehicle, or plug-in electric hybrid electric vehicle and so on. To meet the requirements of the apparatus for the high rate and high energy density of secondary batteries, the battery pack or battery module can be used.

The apparatus, as another example, may be mobile phone, tablet PC, laptop, and the like. The apparatus is usually required to be lightweight and can be powered by the secondary battery.

The beneficial effects of the present application are further described in combination with the examples as follows.

EXAMPLES

To make the invention purpose, technical solution and beneficial technical effects of the present application clearer, the present application is further described in combination with the following examples. However, it should be understood that the examples of the present application is intended only to explain the present application, but not to restrict the present application in any way, and that examples of the present application are not limited to the examples given in the specification. The test conditions or operating conditions not specified in the examples shall be made according to normal conditions or as recommended by the material supplier.

I. Preparation of Secondary Batteries

Example 1

1) Preparation of Positive Electrode Plate

Positive electrode active material $LiNi_{0.8}Co_{0.1}Mn_{0.1}O_2$ (NCM 811), a conductive carbon black (Super-P) and a binder polyvinylidene fluoride (PVDF) at a weight ratio of 96.8:1:2.2 were mixed in an N-methylpyrrolidone solvent (NMP) and well stirred to be homogeneous, thereby giving a slurry. The slurry was applied on an aluminum foil substrate. After drying, cold pressing, splitting, and cutting, a positive electrode plate was obtained. The positive electrode film had an areal density of 17.3 $mg/cm^2$ and a compacted density of 3.5 $g/cm^3$.

2) Preparation of Negative Electrode Plate

Step one, preparing negative slurry 1: a first negative electrode active material, a binder (SBR), a thickener (CMC-Na) and a conductive carbon black (Super-P) at a weight ratio of 96.2:1.8:1.2:0.8 were mixed with stirring in deionized water to prepare the negative slurry 1 in which the number percentage of primary particles in the first negative electrode active material A was 50%;

Step two, preparing negative slurry 2: a second negative electrode active material, a binder (SBR), a thickener (CMC-Na), and a conductive carbon black (Super-P) at a weight ratio of 96.2:1.8:1.2:0.8 were mixed with stirring in a suitable amount of deionized water to prepare negative slurry 2 in which the number percentage of secondary particles in the second negative electrode active material B was 95%;

Step three, the negative slurry 1 and negative slurry 2 were extruded at the same time through a dual-cavity coating apparatus. The negative slurry 1 was coated on a current collector to form a first negative electrode film, and the negative slurry 2 was applied on the first negative electrode film to form a second negative electrode film, wherein the negative electrode film had an areal density of 11.0 $mg/cm^2$ and a compacted density of 1.65 $g/cm^3$; and Step four, the wet film formed through coating was baked in an oven at different temperature areas to form a dried plate, which was subjected to cold pressing to form the desired negative electrode film. After that, striping, cutting and the like were performed to give a negative electrode plate.

3) Separator

PE film was selected as separator.

4) Preparation of Electrolyte Solution

Ethylene carbonate (EC), methyl ethyl carbonate (EMC) and diethyl carbonate (DEC) were mixed according to a volume ratio of 1:1:1. Then a fully dried lithium salt $LiPF_6$ was dissolved into the mixed organic solvent at the ratio of 1 mol/L to prepare an electrolyte solution.

5) Preparation of Battery

The positive plate, the separator and the negative electrode plate described as above were sequentially stacked, and the stack was wound into an electrode assembly. The electrode assembly was packed into an outer package into which the electrolyte was injected. After packaging, standing, formation, aging and the like, a secondary battery was obtained.

The preparation processes of secondary batteries of Examples 2 to 35 and Comparative Examples 1 to 3 were similar to that of Example 1, with the exception that the composition of negative electrode plate and product parameters were adjusted. The different product parameters for different examples are shown in Tables 1 to 3.

II. Test Methods for Performance Parameters

1. Quick Charging Performance Test

At 25° C., the batteries prepared in the above examples and comparative examples were charged and discharged for the first time at a current of 1C (i.e., the current value at which the theoretical capacity is completely discharged within 1 h), in which the charging was a constant-current and constant-voltage charging where the terminal voltage was 4.2V, the cut-off current was 0.05C and the discharging terminal voltage was 2.8V, and then their theoretical capacity was recorded as to C0. Then, constant-current charging of the battery was carried out to arrive at the 4.2V full-cell charging cut-off voltage or 0V negative cut-off potential by using 0.5C0, 1C0, 1.5C0, 2C0, 2.5C0, 3C0, 3.5C0, 4C0 and 4.5C0 in sequence. After each charging was completed, the battery was required to be discharged to 2.8V at LOCO, and the anode potentials when the battery was charged to 10%, 20%, 30%, . . . and 80% SOC State under different charging rates were recorded, which were plotted as a curve of rate-anode potential under different SOC states. By linear fitting, the charging rates when the anode potential was 0V under different SOC states were obtained, the charging rates were a charging window under the SOC State recorded as $C_{10\%SOC}$, $C_{20\%SOC}$, $C_{30\%SOC}$, $C_{40\%SOC}$, $C_{50\%SOC}$, $C_{60\%SOC}$, $C_{70\%SOC}$, $C_{80\%SOC}$, and the charging time T of the battery from 10% SOC to 80% SOC was calculated based on the following formula $(60/C_{20\%SOC}+60/C_{30\%SOC}+60/C_{40\%SOC}+60/C_{50\%SOC}+60/C_{60\%SOC}+60/C_{70\%SOC}+60/C_{80\%SOC})\times 10\%$. The shorter the time T, the more excellent the quick charging performance of the battery.

2. Cycle Performance Test

At 25° C., the batteries prepared in the above examples and comparative examples were charged and discharged for the first time at a current of 1C, in which the charging was a constant-current and constant-voltage charging where the terminal voltage was 4.2V, the cut-off current was 0.05C and the discharging terminal voltage was 2.8V, and then the discharging capacity of the batteries for the first cycle was recorded as to Cb. Then the cycle life test was carried out at a normal temperature (25° C.), in which a 1C/1C cycle was implemented, and the discharge capacity Ce of the battery was recorded. The ratio of Ce to Cb was a cycle capacity retention rate. When the cycle capacity retention rate was equal to 80%, the test was stopped and the number of cycles was recorded.

III. Test Results for Each of Examples and Comparative Examples

In accordance with the above methods, the batteries of the examples and comparative examples were prepared, and tested for various performance parameters. The results are shown in Tables 1 to 3 as below.

First, it was shown from the data of Examples 1 to 13 and Comparative Examples 1 to 3 that: only when the first negative electrode active material and the second negative electrode active material both included artificial graphite and the number percentage of primary particles in the first negative electrode active material was A≥50%, the obtained secondary battery had both good cycle performance and quick charging performance. When the first negative electrode active material contained only natural graphite (Comparative Example 3), the cycle performance of the battery was poor. When both the first negative electrode active material and the second negative electrode active material included artificial graphite but the number percentage of primary particles in the first negative electrode active material was A<50% (Comparative Examples 1 and 2), the cycle performance and quick charging performance of the batteries were poor. In addition, as shown by comparing the data of Examples 1-13, in terms of cycle performance and quick charging performance, the number percentage of primary particles in the first negative electrode active material should be relatively high. Generally speaking, when A≥70%, the effect was better and 80%≤A≤100% was the most preferred.

In addition, it was also shown by the data of Example 5 and Examples 8 to 13 that: under the premise that both the first negative electrode active material and the second negative electrode active material included artificial graphite, and the number percentage of primary particles in the first negative electrode active material A≥50%, the number percentage of secondary particles in the second negative electrode active material, B, also had a certain impact on the performance of the batteries. Especially when B≥30%, the quick charging performance and cycle performance of the batteries were greatly improved.

It was further shown by the experimental data of Examples 14-24 in Table 2 that the particle size (and its distribution) of the negative electrode active material had a certain impact on the performance of the batteries. In Example 14, when the Dv10 of the first negative electrode active material was too small, it will block the pores of the first negative electrode film, resulting in deterioration of quick charging performance. In Example 20, when the Dv10 of the first negative electrode active material was too large, it will affect the energy density. In order to ensure the same energy density design, it was only necessary to increase the compacted density so as to reduce the porosity, which caused the quick charging performance to reduce, and rendered particles to be broken and cycle performance to deteriorate. In Example 21, when the Dv10 of the second negative electrode active material was too small, it will block the pores of the second negative electrode film and it was difficult to be compacted firmly, resulting in deterioration of quick charging performance and cycle performance. In Example 23, when the Dv10 of the second negative electrode active material was too large, it will affect the electronic conductance and charge exchange impedance, and then affect the quick charging performance. In addition, as shown in Example 24, when the Dv10 of the first negative electrode active material was greater than the Dv10 of the second negative electrode active material, the lower negative electrode film was more difficult to be compacted. In order to ensure the same energy density design, the compacted density of the lower negative electrode film should be increased so that all pressure was borne by the upper negative electrode film. As a result, the upper negative electrode film had lower porosity and the quick charging performance was deteriorated, and the upper negative electrode film was crushed, which further blocked the pores and deteriorated the cycle performance.

It was further shown by the experimental data of Examples 25 to 35 in Table 3 that the tap density of the negative electrode active material had a certain impact on the battery performance. Generally, the lower the tap density of the first negative electrode film, the lower the energy density is. Therefore, when the tap density of the first negative electrode film was too small (for example, Example 25), in order to ensure the same energy density design, the compacted density of the first negative electrode film should be increased so that the porosity was lowered and the quick charging performance was deteriorated, and particles was crushed, which further deteriorated the cycle performance. Generally, the greater the tap density of the first negative electrode film, the denser the filling is. Therefore, when the tap density of the first negative electrode film was too large (for example, Example 31), the porosity of the first negative electrode film was low, which will negatively affect the quick charging performance, and at the same time, the cycle performance was insufficient and will decay quickly in the late. When the tap density of the second negative electrode film was too small (such as Example 32), it was difficult to be compacted firmly. In order to ensure the same energy density design, the compacted density of the second negative electrode should increase, which will reduce the porosity and decrease the quick charging performance and which further caused particles to be broken and the cycle performance to deteriorate. When the tap density of the second negative electrode film was too large (such as Example 34), the filling was too dense and the porosity of the second negative electrode film was low, which will negatively affect the quick charging performance, and at the same time, the cycle performance was insufficient and will decay quickly in the late. In addition, as shown in Example 35, when the tap density of the second negative electrode film was greater than the tap density of the first negative electrode film, the second negative electrode film was filled more densely, which will affect the quick charging performance, cause particles to be broken and affect cycle performance.

Below are some exemplary embodiments of the present application.

Embodiment 1. A secondary battery, comprising a negative electrode plate, wherein the negative electrode plate comprises a negative electrode current collector and a negative electrode film, and the negative electrode film comprises a first negative electrode film and a second negative electrode film;

the first negative electrode film is disposed on at least one surface of the negative electrode current collector and comprises a first negative electrode active material;

the second negative electrode film is disposed on the first negative electrode film and comprises a second negative electrode active material;

the first negative electrode active material and the second negative electrode active material both comprise artificial graphite; and the first negative electrode active material comprises primary particles, and a number percentage of the primary particles in the first negative electrode active material A satisfies A≥50%.

Embodiment 2. The secondary battery according to Embodiment 1, wherein A≥70%; preferably, 80%≤A≤100%.

Embodiment 3. The secondary battery according to any one of Embodiments 1 to 2, wherein the second negative electrode active material comprises secondary particles, and a number percentage of the secondary particles in the second negative electrode active material B satisfies: B≥30%; preferably, B≥50%.

Embodiment 4. The secondary battery according to any one of Embodiments 1 to 3, wherein a volume distribution particle size DV10 of the first negative electrode active material is smaller than a volume distribution particle size DV10 of the second negative electrode active material.

Embodiment 5. The secondary battery according to any one of Embodiments 1 to 4, wherein the volume distribution particle size DV10 of the first negative electrode active material is from 3 μm to 8 μm, preferably from 4 μm to 7 μm; and/or, the volume distribution particle size DV10 of the second negative electrode active material is from 5 μm to 11 μm, preferably from 6 μm to 10 μm.

Embodiment 6. The secondary battery according to any one of Embodiments 1 to 5, wherein a tap density of the first negative electrode active material is greater than a tap density of the second negative electrode active material.

Embodiment 7. The secondary battery according to any one of Embodiments 1 to 6, wherein the tap density of the first negative electrode active material is from 0.8 g/cm$^3$ to 1.3 g/cm$^3$, preferably from 0.95 g/cm$^3$ to 1.15 g/cm$^3$; and/or, the tap density of the second negative electrode active material is from 0.7 g/cm$^3$ to 1.2 g/cm$^3$, preferably from 0.85 g/cm$^3$ to 1.05 g/cm$^3$.

Embodiment 8. The secondary battery according to any one of Embodiments 1 to 7, wherein a volume distribution particle size DV50 of the first negative electrode active material is greater than a volume distribution particle size DV50 of the second negative electrode active material.

Embodiment 9. The secondary battery according to any one of Embodiments 1 to 8, wherein the volume distribution particle size DV50 of the first negative electrode active material is from 13 μm to 21 μm, preferably from 15 μm to 19 μm; and/or, the volume distribution particle size DV50 of the second negative electrode active material is from 11 μm to 19 μm, preferably from 13 μm to 17 μm.

Embodiment 10. The secondary battery according to any one of Embodiments 1 to 9, wherein a graphitization degree of the first negative electrode active material is greater than a graphitization degree of the second negative electrode active material.

Embodiment 11. The secondary battery according to any one of Embodiments 1 to 10, wherein the graphitization degree of the first negative electrode active material is from 92% to 97%, preferably from 93% to 96%; and/or, the graphitization degree of the second negative electrode active material is from 90% to 95%, preferably from 92% to 94%.

Embodiment 12. The secondary battery according to any one of Embodiments 1 to 11, wherein the first negative electrode active material has a specific surface area (SSA) of from 1.6 m$^2$/g to 2.6 m$^2$/g, preferably from 1.8 m$^2$/g to 2.3 m$^2$/g; and/or, the second negative electrode active material has a specific surface area (SSA) of from 0.7 m$^2$/g to 1.5 m$^2$/g, preferably from 0.8 m$^2$/g to 1.3 m$^2$/g.

Embodiment 13. The secondary battery according to any one of Embodiments 1-12, wherein the artificial graphite is present in the first negative electrode active material in a mass percentage of ≥50%, preferably from 60% to 100%; and/or, the artificial graphite is present in the second negative electrode active material in a mass percentage of ≥80%, preferably 90%-100%.

Embodiment 14. A process for preparing a secondary battery, comprising preparing a negative electrode plate of the secondary battery by the following steps:

1) forming a first negative electrode film comprising a first negative electrode active material on at least one surface of a negative electrode current collector; and 2) forming a second negative electrode film comprising a second negative electrode active material on the first negative electrode film, wherein the first and second negative electrode active material both comprise artificial graphite; the first negative electrode active material comprises primary particles, and a number percentage of the primary particles in the first negative electrode active material A satisfies A≥50%.

Embodiment 15. An apparatus, comprising the secondary battery according to any one of Embodiments 1-13 or the secondary battery manufactured by the process according to Embodiment 14.

It should also be supplemented that according to the disclosure and guidance of the above-mentioned specifications, those skilled in the art may also make appropriate changes and modifications to the above-mentioned examples. Therefore, the present application is not limited to the specific examples disclosed and described above, and some modifications and changes to the present application fall within the scope of protection of the claims of the present application. In addition, although a number of specific terms are used in this specification, these terms are intended for convenience only and do not constitute any restriction on the present application.

TABLE 1

| No. | Type and mass ratio of the first negative electrode active material | Percentage of Primary particles in the first negative electrode active material A | Type of the second negative electrode active material | Percentage of Secondary particles in the second negative electrode active material B | Quick charging performance (min) | Cycle performance |
|---|---|---|---|---|---|---|
| Ex. 1 | 100% Artificial graphite | 50% | 100% Artificial graphite | 95% | 19.3 | 1652 |
| Ex. 2 | 100% Artificial graphite | 65% | 100% Artificial graphite | 95% | 19.0 | 1707 |
| Ex. 3 | 100% Artificial graphite | 76% | 100% Artificial graphite | 95% | 18.7 | 1771 |
| Ex. 4 | 100% Artificial graphite | 83% | 100% Artificial graphite | 95% | 18.5 | 1813 |
| Ex. 5 | 100% Artificial graphite | 92% | 100% Artificial graphite | 95% | 18.3 | 1895 |
| Ex. 6 | 80% Artificial graphite + 20% Natural graphite | 92% | 100% Artificial graphite | 95% | 18.0 | 1711 |
| Ex. 7 | 60% Artificial graphite + 40% Natural graphite | 92% | 100% Artificial graphite | 95% | 17.8 | 1604 |
| Ex. 8 | 100% Artificial graphite | 92% | 100% Artificial graphite | 10% | 22.3 | 1715 |
| Ex. 9 | 100% Artificial graphite | 92% | 100% Artificial graphite | 30% | 21.2 | 1781 |
| Ex. 10 | 100% Artificial graphite | 92% | 100% Artificial graphite | 55% | 20.4 | 1802 |
| Ex. 11 | 100% Artificial graphite | 92% | 100% Artificial graphite | 68% | 19.8 | 1835 |
| Ex. 12 | 100% Artificial graphite | 92% | 100% Artificial graphite | 75% | 19.4 | 1863 |
| Ex. 13 | 100% Artificial graphite | 92% | 100% Artificial graphite | 85% | 18.7 | 1882 |

TABLE 1-continued

| No. | Type and mass ratio of the first negative electrode active material | Percentage of Primary particles in the first negative electrode active material A | Type of the second negative electrode active material | Percentage of Secondary particles in the second negative electrode active material B | Quick charging performance (min) | Cycle performance |
|---|---|---|---|---|---|---|
| CEx. 1 | 100% Artificial graphite | 10% | 100% Artificial graphite | 95% | 28.1 | 532 |
| CEx. 2 | 80% Artificial graphite + 20% Natural graphite | 20% | 100% Artificial graphite | 95% | 25.4 | 1305 |
| CEx. 3 | 100% Natural graphite | 92% | 100% Artificial graphite | 95% | 17.5 | 1425 |

TABLE 2

| No. | Type of the first negative electrode active material | Percentage of Primary particles in the first negative electrode active material A | DV10 of the first negative active material (μm) | Type of the second negative electrode active material | Percentage of Secondary particles in the second negative electrode active material B | DV10 of the second negative active material (μm) | Quick charging performance (min) | Cycle performance |
|---|---|---|---|---|---|---|---|---|
| Ex. 14 | 100% Artificial graphite | 92% | 2.8 | 100% Artificial graphite | 95% | 7.9 | 20.5 | 1888 |
| Ex. 15 | 100% Artificial graphite | 92% | 3.3 | 100% Artificial graphite | 95% | 7.9 | 19.6 | 1890 |
| Ex. 16 | 100% Artificial graphite | 92% | 4.6 | 100% Artificial graphite | 95% | 7.9 | 18.1 | 1892 |
| Ex. 17 | 100% Artificial graphite | 92% | 5.7 | 100% Artificial graphite | 95% | 7.9 | 17.8 | 1899 |
| Ex. 18 | 100% Artificial graphite | 92% | 6.6 | 100% Artificial graphite | 95% | 7.9 | 18.7 | 1897 |
| Ex. 19 | 100% Artificial graphite | 92% | 7.5 | 100% Artificial graphite | 95% | 7.9 | 19.2 | 1754 |
| Ex. 20 | 100% Artificial graphite | 92% | 8.2 | 100% Artificial graphite | 95% | 8.5 | 21.5 | 1589 |
| Ex. 21 | 100% Artificial graphite | 92% | 4.4 | 100% Artificial graphite | 95% | 4.6 | 20.8 | 1841 |
| Ex. 22 | 100% Artificial graphite | 92% | 4.4 | 100% Artificial graphite | 95% | 5.5 | 18.9 | 1874 |
| Ex. 23 | 100% Artificial graphite | 92% | 4.4 | 100% Artificial graphite | 95% | 10.8 | 20.4 | 1857 |
| Ex. 24 | 100% Artificial graphite | 92% | 8.2 | 100% Artificial graphite | 95% | 6.8 | 21.6 | 1524 |

TABLE 3

| No. | Type of the first negative electrode active material | Percentage of Primary particles in the first negative electrode active material A | Tap density of the first negative electrode active material (g/cm³) | Type of the second negative electrode active material | Percentage of Secondary particles in the second negative electrode active material B | Tap density of the second negative electrode active material (g/cm³) | Quick charging performance (min) | Cycle performance |
|---|---|---|---|---|---|---|---|---|
| Ex. 25 | 100% Artificial graphite | 92% | 0.76 | 100% Artificial graphite | 95% | 0.71 | 21.5 | 1601 |
| Ex. 26 | 100% Artificial graphite | 92% | 0.88 | 100% Artificial graphite | 95% | 0.87 | 19.5 | 1705 |
| Ex. 27 | 100% Artificial graphite | 92% | 0.96 | 100% Artificial graphite | 95% | 0.87 | 18.6 | 1812 |
| Ex. 28 | 100% Artificial graphite | 92% | 1.06 | 100% Artificial graphite | 95% | 0.87 | 18.3 | 1895 |
| Ex. 29 | 100% Artificial graphite | 92% | 1.13 | 100% Artificial graphite | 95% | 0.87 | 18.7 | 1883 |
| Ex. 30 | 100% Artificial graphite | 92% | 1.26 | 100% Artificial graphite | 95% | 0.87 | 19.3 | 1874 |
| Ex. 31 | 100% Artificial graphite | 92% | 1.34 | 100% Artificial graphite | 95% | 0.87 | 20.4 | 1659 |
| Ex. 32 | 100% Artificial graphite | 92% | 1.06 | 100% Artificial graphite | 95% | 0.68 | 22.1 | 1756 |
| Ex. 33 | 100% Artificial graphite | 92% | 1.06 | 100% Artificial graphite | 95% | 0.75 | 21.3 | 1800 |
| Ex. 34 | 100% Artificial graphite | 92% | 1.13 | 100% Artificial graphite | 95% | 1.11 | 21.9 | 1627 |
| Ex. 35 | 100% Artificial graphite | 92% | 0.76 | 100% Artificial graphite | 95% | 0.87 | 22.0 | 1511 |

What is claimed is:

1. A secondary battery (5), comprising a negative electrode plate (10), wherein the negative electrode plate (10) comprises a negative electrode current collector (101) and a negative electrode film (102, 103), and the negative electrode film (102, 103) comprises a first negative electrode film (103) and a second negative electrode film (102);

the first negative electrode film (103) is disposed on at least one surface of the negative electrode current collector (101) and comprises a first negative electrode active material;

the second negative electrode film (102) is disposed on the first negative electrode film (103) and comprises a second negative electrode active material;

the first negative electrode active material and the second negative electrode active material both comprise artificial graphite;

the first negative electrode active material comprises primary particles, and a number percentage of the primary particles in the first negative electrode active material A satisfies A≥50%, and the second negative electrode active material comprises secondary particles, and a number percentage of the secondary particles in the second negative electrode active material B satisfies: B≥30%; and a volume distribution particle size DV50 of the first negative electrode active material is greater than a volume distribution particle size DV50 of the second negative electrode active material.

2. The secondary battery (5) according to claim 1, wherein A≥70%.

3. The secondary battery (5) according to claim 1, wherein B≥50%.

4. The secondary battery (5) according to claim 1, wherein a volume distribution particle size DV10 of the first negative electrode active material is smaller than a volume distribution particle size DV10 of the second negative electrode active material.

5. The secondary battery (5) according to claim 4, wherein the volume distribution particle size DV10 of the first negative electrode active material is from 3 μm to 8 μm; and/or,
the volume distribution particle size DV10 of the second negative electrode active material is from 5 μm to 11 μm.

6. The secondary battery (5) according to claim 4, wherein the volume distribution particle size DV10 of the first negative electrode active material is from 4 μm to 7 μm; and/or,
the volume distribution particle size DV10 of the second negative electrode active material is from 6 μm to 10 μm.

7. The secondary battery (5) according to claim 1, wherein a tap density of the first negative electrode active material is greater than a tap density of the second negative electrode active material.

8. The secondary battery (5) according to claim 7, wherein the tap density of the first negative electrode active material is from 0.8 g/cm$^3$ to 1.3 g/cm$^3$; and/or,
the tap density of the second negative electrode active material is from 0.7 g/cm$^3$ to 1.2 g/cm$^3$.

9. The secondary battery (5) according to claim 1, wherein the volume distribution particle size DV50 of the first negative electrode active material is from 13 μm to 21 μm; and/or,
the volume distribution particle size DV50 of the second negative electrode active material is from 11 μm to 19 μm.

10. The secondary battery according to claim 1, wherein a graphitization degree of the first negative electrode active material is greater than a graphitization degree of the second negative electrode active material.

11. The secondary battery (5) according to claim 10, wherein the graphitization degree of the first negative electrode active material is from 92% to 97%; and/or,
the graphitization degree of the second negative electrode active material is from 90% to 95%.

12. The secondary battery (5) according to claim 1, wherein
the first negative electrode active material has a specific surface area (SSA) of from 1.6 m$^2$/g to 2.6 m$^2$/g; and/or,
the second negative electrode active material has a specific surface area (SSA) of from 0.7 m$^2$/g to 1.5 m$^2$/g.

13. The secondary battery (5) according to claim 1, wherein the artificial graphite is present in the first negative electrode active material in a mass percentage of ≥50%; and/or,
The artificial graphite is present in the second negative electrode active material in a mass percentage of ≥80%.

14. The secondary battery (5) according to claim 1, wherein 80%≤A≤100%.

15. The secondary battery (5) according to claim 1, wherein
the volume distribution particle size DV50 of the first negative electrode active material is from 15 μm to 19 μm; and/or,
the volume distribution particle size DV50 of the second negative electrode active material is from 13 μm to 17 μm.

16. An apparatus, comprising the secondary battery (5) according to claim 1.

17. A process for preparing a secondary battery (5), comprising preparing a negative electrode plate (10) of the secondary battery by the following steps:

1) forming a first negative electrode film (103) comprising a first negative electrode active material on at least one surface of a negative electrode current collector (10); and 2) forming a second negative electrode film (102) comprising a second negative electrode active material on the first negative electrode film (103), wherein the first and second negative electrode active material both comprise artificial graphite; the first negative electrode active material comprises primary particles, a number percentage of the primary particles in the first negative electrode active material A satisfies A≥50%, and the second negative electrode active material comprises secondary particles, and a number percentage of the secondary particles in the second negative electrode active material B satisfies: B≥30%; and a volume distribution particle size DV50 of the first negative electrode active material is greater than a volume distribution particle size DV50 of the second negative electrode active material.

18. An apparatus, comprising the secondary battery (5) manufactured by the process according to claim 17.

* * * * *